United States Patent
Ahn et al.

(10) Patent No.: US 10,848,281 B2
(45) Date of Patent: Nov. 24, 2020

(54) COORDINATED TRANSMISSION IN UNLICENSED BAND

(71) Applicant: LG ELECTRONICS INC., Seoul (KR)

(72) Inventors: Joonkui Ahn, Seoul (KR); Kijun Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/090,161

(22) PCT Filed: Mar. 28, 2017

(86) PCT No.: PCT/KR2017/003355
§ 371 (c)(1),
(2) Date: Sep. 28, 2018

(87) PCT Pub. No.: WO2017/171369
PCT Pub. Date: Oct. 5, 2017

(65) Prior Publication Data
US 2019/0109682 A1    Apr. 11, 2019

Related U.S. Application Data

(60) Provisional application No. 62/313,813, filed on Mar. 28, 2016.

(51) Int. Cl.
*H04L 5/00*     (2006.01)
*H04W 72/12*    (2009.01)
(Continued)

(52) U.S. Cl.
CPC .......... *H04L 5/0035* (2013.01); *H04L 5/0044* (2013.01); *H04L 5/0091* (2013.01);
(Continued)

(58) Field of Classification Search
CPC ... H04L 5/0035; H04L 5/0044; H04L 5/0091; H04L 27/06; H04W 72/1289
See application file for complete search history.

(56) References Cited

U.S. PATENT DOCUMENTS 9,538,430 B2 *  1/2017  Khay-Ibbat ....... H04W 36/0066
9,923,688 B2 *  3/2018  Imamura ............... H04W 28/06
(Continued)

FOREIGN PATENT DOCUMENTS

KR    20120092523    8/2012

OTHER PUBLICATIONS

PCT International Application No. PCT/KR2017/003355, International Search Report dated Jun. 23, 2017, 4 pages.
(Continued)

*Primary Examiner* — Rhonda L Murphy
(74) *Attorney, Agent, or Firm* — Lee, Hong, Degerman, Kang & Waimey

(57) ABSTRACT

Provided are a method for coordinated multi-point (CoMP) transmission in an unlicensed band and a device using the same. In the unlicensed band, the device receives, from one transmission point (TP) of a plurality of TPs, a physical downlink control channel (PDCCH) having scheduling information for scheduling a physical downlink shared channel (PDSCH). The device decodes, according to the scheduling information, the PDSCH with respect to at least one TP, which has successfully detected the PDSCH, among the plurality of TPs.

4 Claims, 7 Drawing Sheets

(51) Int. Cl.
  H04L 27/06 (2006.01)
  H04W 28/26 (2009.01)
  H04W 74/08 (2009.01)
  H04B 7/024 (2017.01)
(52) U.S. Cl.
  CPC ............ H04L 27/06 (2013.01); H04W 28/26 (2013.01); H04W 72/1289 (2013.01); H04W 74/0816 (2013.01); H04B 7/024 (2013.01); H04L 5/001 (2013.01); H04L 5/0051 (2013.01); H04W 74/0808 (2013.01)

(56) References Cited

U.S. PATENT DOCUMENTS

| | | |
|---|---|---|
| 2014/0286189 A1 | 9/2014 | Kang et al. |
| 2015/0215090 A1 | 6/2015 | Sayana et al. |
| 2015/0349940 A1 | 12/2015 | Kim et al. |
| 2016/0135143 A1* | 5/2016 | Won .................... H04W 72/005 370/312 |
| 2016/0226645 A1* | 8/2016 | Kim ...................... H04L 1/1861 |
| 2017/0070312 A1* | 3/2017 | Yi ........................ H04J 11/0069 |
| 2017/0318568 A1* | 11/2017 | Nimbalker .......... H04W 72/042 |
| 2018/0279403 A1* | 9/2018 | Kim ......................... H04L 5/00 |
| 2019/0373301 A1* | 12/2019 | Gunasekara ....... H04N 21/2393 |

OTHER PUBLICATIONS

Intel Corporation, "Support of dynamic point switching CoMP for LAA systems," 3GPP TSG-RAN WG1 #82, R1-154088, Aug. 2015, 4 pages.

3rd Generation Partnership Project (3GPP), "Technical Specification Group Radio Access Network; Evolved Universal Terrestrial Radio Access (E-UTRA); Physical channels and modulation (Release 11)," section 6.10 of 3GPP TS 36.211 V11.5.0, Dec. 2013, 27 pages.

* cited by examiner

COORDINATED TRANSMISSION IN UNLICENSED BAND

CROSS-REFERENCE TO RELATED APPLICATIONS

This application is the National Stage filing under 35 U.S.C. 371 of International Application No. PCT/KR2017/003355, filed on Mar. 28, 2017, which claims the benefit of U.S. Provisional Application No. 62/313,813, filed on Mar. 28, 2016, the contents of which are all hereby incorporated by reference herein in their entirety.

BACKGROUND OF THE INVENTION

Field of the Invention

The present invention relates to wireless communication, and more particularly, to a method supporting coordinated multi-point (CoMP) transmission in an unlicensed band, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Coordinated multi-point (CoMP) transmission in which a plurality of cells cooperate can be applied to the unlicensed band. Since each cell determines whether any transmission is acceptable based on a CCA result in the unlicensed band, a UE may not confirm which node actually performs CoMP transmission.

SUMMARY OF THE INVENTION

The present invention provides a method for supporting coordinated multi-point (CoMP) transmission and a device using the method.

In an aspect, a method for CoMP transmission in an unlicensed band includes receiving, by a wireless device, a physical downlink control channel (PDCCH) having scheduling information for scheduling a physical downlink shared channel (PDSCH) from one transmission point (TP) among a plurality of TPs in the unlicensed band, and decoding, by the wireless device, the PDSCH with respect to at least one TP, which has successfully detected the PDSCH, among the plurality of TPs according to the scheduling information.

In another aspect, a device for supporting CoMP transmission in an unlicensed band includes a transceiver configured to transmit and receive a radio signal, and a processor operatively coupled to the transceiver. The processor is configured to receive a physical downlink control channel (PDCCH) having scheduling information for scheduling a physical downlink shared channel (PDSCH) from one transmission point (TP) among a plurality of TPs in the unlicensed band, and decode the PDSCH with respect to at least one TP, which has successfully detected the PDSCH, among the plurality of TPs according to the scheduling information.

CoMP transmission can be supported in a band in which various protocols exist.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
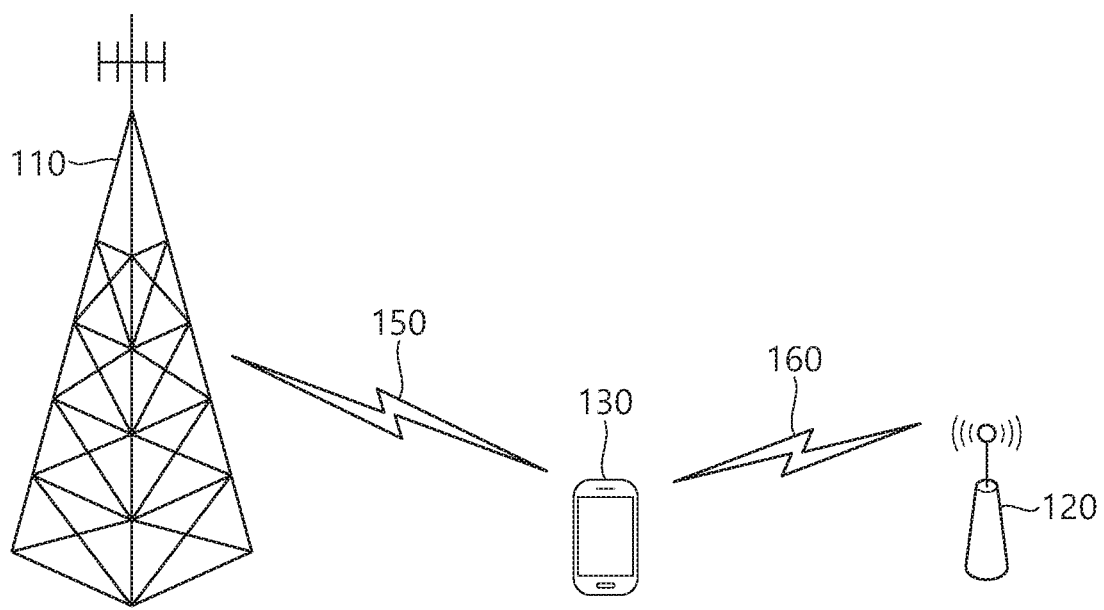
FIG. 1 shows an example of a Long Term Evolution (LTE) service using an unlicensed band.

FIG. 1 shows an example of an LTE service using an unlicensed band.

A wireless device 130 establishes a connection with a 1st BS 110, and receives a service through a licensed band. For traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Hereinafter, a cell (or a carrier) operating in an unlicensed band is called an unlicensed cell. A cell operating in a licensed band is called a licensed cell. For clarity, it is assumed that the licensed cell is a primary cell and the unlicensed cell is a secondary cell.

Hereinafter, a radio frame includes 10 subframes. One subframe may include a plurality of orthogonal frequency division multiplexing (OFDM) symbols in a time domain. A time required to transmit one subframe is defined as a transmission time interval (TTI). For example, 1 TTI may be 1 millisecond (ms). The OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 2:
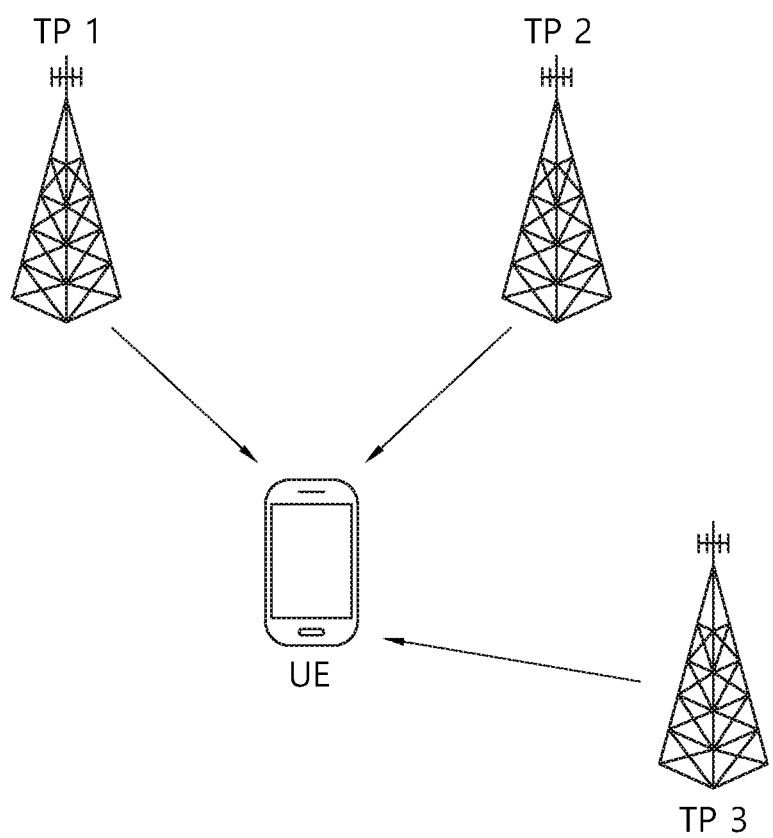
FIG. 2 shows an example of cooperative multi-point (CoMP) transmission.

FIG. 2 shows an example of cooperative multi-point (CoMP) transmission.

A transmission point (TP) is a transmission node performing downlink (DL) transmission. The TP may include a BS, a cell managed by the BS, a relay, or the like.

In an unlicensed band, the TP may transmit a transmission burst when CCA is successful. One transmission burst may be transmitted in one or more consecutive subframes.

The TP may periodically transmit a discovery reference signal (DRS). The DRS may be used for cell discovery, downlink synchronization, downlink measurement, or the like. A DL signal based on the conventional 3GPP LTE may be used as the DRS. At least any one of a cell specific reference signal (CRS), a primary synchronization signal (PSS), a secondary synchronization signal (SSS), a physical broadcast channel (PBCH), and a channel state information-reference signal (CSI-RS) and/or a combination thereof may be used. A UE may perform a radio resource management (RRM) measurement through the CRS or CSI-RS in the DRS.

A plurality of TPs which cooperate in cooperative multipoint (CoMP) transmission are referred to as a CoMP group. A DL CoMP transmission scheme in the unlicensed band may be classified as follows according to a cell ID allocation between cooperative cells. A cell ID refers to a physical cell ID which can be directly acquired by the UE on the basis of a synchronization signal (PSS/SSS) transmitted by a corresponding TP. A virtual cell ID refers to a parameter given for a corresponding TP (or a TP set) through higher layer signaling or the like.

(1) CoMP-A: A plurality of TPs in a CoMP group have the same cell ID. The TPs in the CoMP group transmit a CRS generated based on the same cell ID. The UE cannot identify the TP on the basis of the received CRS. A demodulation reference signal (DM-RS) used for demodulation of a control channel (e.g., enhanced physical downlink control channel (EPDCCH)) and a data channel (e.g., physical downlink shared channel (PDSCH)) is generated based on the virtual cell ID. The virtual cell ID of the TP may change dynamically in each subframe.

(2) CoMP-B: A plurality of TPs in a CoMP group have different cell IDs. The TPs in the CoMP group transmit a CRS generated based on the different cell ID. A DM-RS used to demodulate a control channel and a data channel is generated based on a virtual cell ID. A virtual cell ID of a TP may change dynamically in each subframe.

In addition, the DL CoMP transmission scheme may be classified as follows according to whether a data channel (e.g., PDSCH) is transmitted simultaneously between cooperative cells.

(1) JT (joint transmission): PDSCH simultaneous transmission through different DM-RSs from a plurality of TPs in a CoMP group is allowed. Precoding information and DM-RS/PDSCH information simultaneously transmitted through a control channel (PDCCH or EPDCCH) may be provided.

(2) DPS (dynamic point switching): Only one TP among a plurality of TPs in a CoMP group transmits a PDSCH at one time point.

A DRS may include a CRS based on CoMP-A or CoMP-B. According to the section 6.10 of 3GPP TS 36.211 V11.5.0 (2013-12), a sequence for the CRS is as follows.

$$r_{l,n_s}(m) = \frac{1}{\sqrt{2}}(1 - 2 \cdot c(2m)) + j\frac{1}{\sqrt{2}}(1 - 2 \cdot c(2m+1)).$$ [Equation 1]

Herein, a pseudo-random sequence c(i) is initialized to $c_{init}=2^{10}(7(n_s+1)+l+1)(2N_{cell}+1)+2N_{cell}+N_{CP}$. ns is a slot number in a radio frame, and l is an OFDM symbol number in a slot. In a normal cyclic prefix (CP), $N_{CP}=1$. In an extended CP, $N_{CP}=0$. Ncell is a cell ID in CoMP-A, and a virtual cell ID in CoMP-B.

A DMTC (DRS measurement timing configuration) duration is a duration in which a DRS is transmitted. In an unlicensed band, the TP may transmit the DRS when CCA is successful during the DMTC duration. When a UE performs an RRM measurement through the CRS in the DRS in the CoMP-A scheme, if a TP combination for transmitting the DRS varies since the CCA is successful among TPs belonging to a CoMP group according to a DRS transmission time point, a network cannot distinguish a specific TP combination of which a result corresponds to an RRM measurement result reported by the UE.

Figure 3:
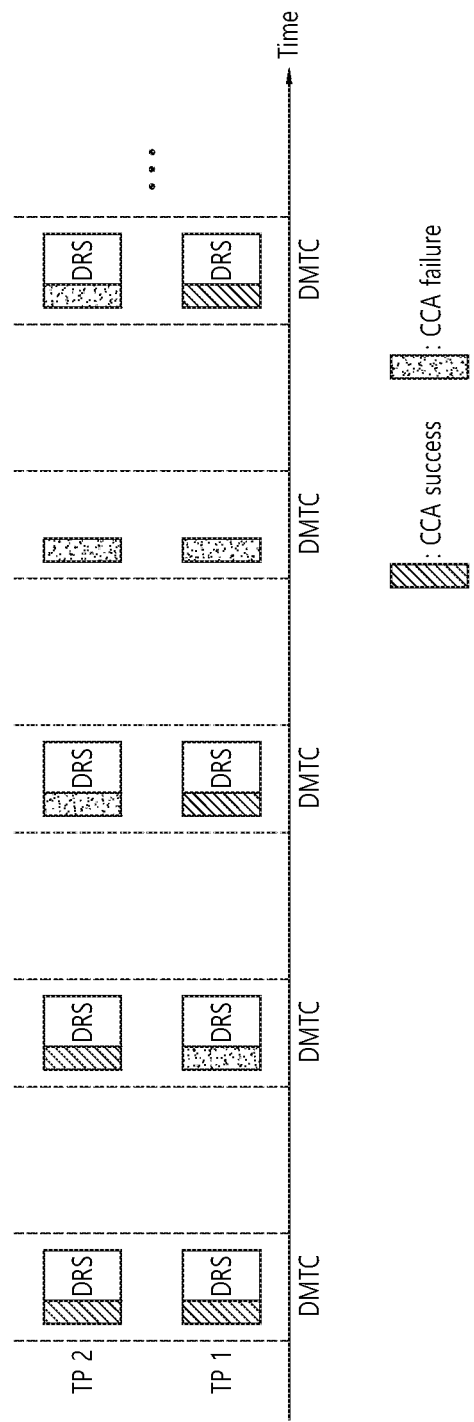
FIG. 3 shows CoMP transmission according to an embodiment of the present invention.

FIG. 3 shows CoMP transmission according to an embodiment of the present invention.

All TPs in a CoMP group may always transmit a DRS simultaneously. If all TPs in the CoMP group do not succeed in CCA, the DRS is not transmitted. The DRS is transmitted only when all TPs succeed in the CCA.

In order to increase a DRS transmission probability, if there is at least one TP which has succeeded in the CCA among the plurality of TPs in the CoMP group, all TPs in the CoMP group may be allowed to transmit the DRS. Alternatively, if a specific TP has succeeded in the CCA, all TPs in the CoMP group may be allowed to transmit the DRS. The specific TP may be fixed or may change whenever LBT is attempted or when at least a specific time interval elapses.

A UE may average and report RRM measurements acquired by DRSs transmitted at different timings.

Figure 4:
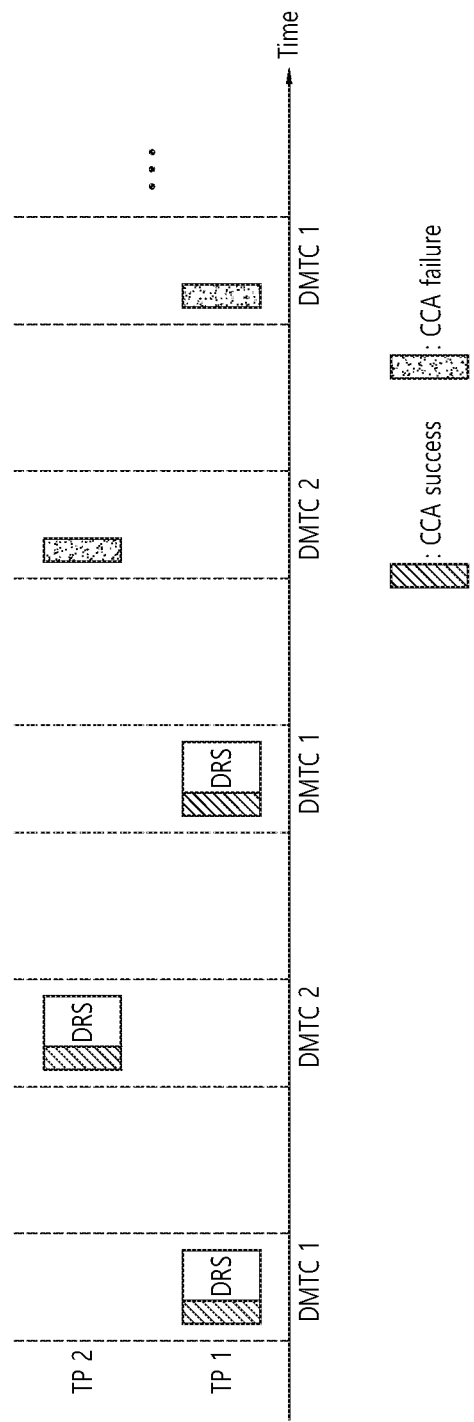
FIG. 4 shows CoMP transmission according to another embodiment of the present invention.

FIG. 4 shows CoMP transmission according to another embodiment of the present invention.

For each TP, a DMTC may be set in a CoMP group. It is shown herein that two DMTCs are set, two TPs in the CoMP group perform CCA in different DMTC durations, and a DRS is transmitted when CCA is successful.

A UE may perform an RRM measurement and report independent of each DMTC.

Figure 5:
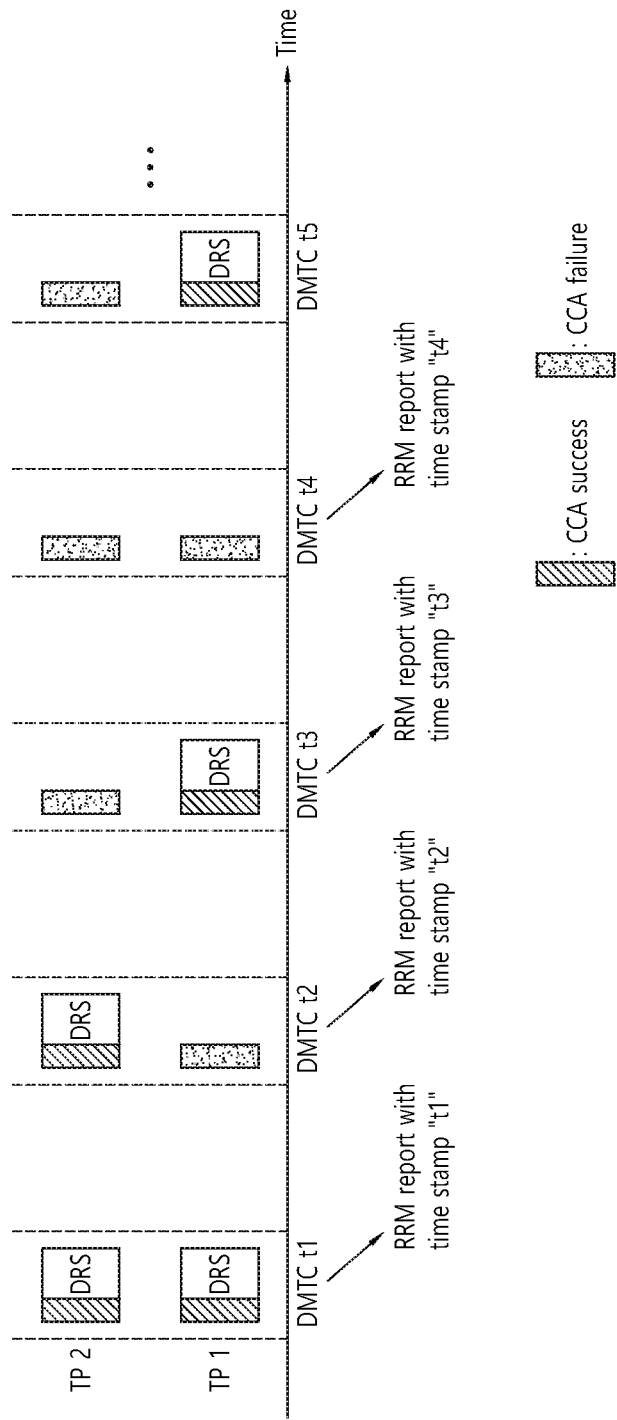
FIG. 5 shows CoMP transmission according to another embodiment of the present invention.

FIG. 5 shows CoMP transmission according to another embodiment of the present invention.

A UE independently performs an RRM measurement on DRSs transmitted at different timings, and reports timing information together with a corresponding measurement result. Since a network knows a TP combination which has transmitted the DRS at the reported timing, the network may acquire the measurement result based on each TP combination.

The UE which has received DRSs from two TPs in a first DMTC duration measures a channel state. In addition, the UE reports information indicating the measured channel state and the first DMTC duration to the network. Since the network knows that a TP1 and a TP2 have transmitted the DRS in the first DMTC duration, the network may know that the channel state reported by the UE is for the TP1 and the TP2.

In a CoMP-A scheme, TPs in the CoMP group may operate to transmit CSI-RSs generated from different cell IDs. When the UE performs the RRM measurement and report through the CSI-RS in the DRS, if a TP combination for transmitting the DRS varies since CCA is successful among TPs belonging to the CoMP group according to a DRS transmission time point, the UE cannot know which CSI-RS is to be transmitted through the DRS. Therefore, any one of the aforementioned embodiments of FIG. 3 to FIG. 5 may be applied to the RRM measurement and report using the CSI-RS.

The UE may report information regarding whether the CSI-RS is actually received, together with the RRM measurement result. The UE determines whether transmission is actually performed through energy detection or the like during transmission of CSI-RSs available for transmission of respective DRSs. The UE may report only the RRM measurement on the CSI-RS transmitted actually, or may report information regarding whether the CSI-RS is determined as actual transmission, together therewith.

In the CoMP-A scheme or CoMP-B scheme, when the UE measures a channel state based on the CRS or the CSI-RS, the TP combination may differ for each transmission burst or subframe according to a CCA result. The TP combination which has actually transmitted the CRS used by the UE or whether the CSI-RS considered in measurement is actually transmitted varies. Accordingly, the following schemes are proposed to prevent a discrepancy between a channel state reported by the UE and a channel state understood by the network.

In a first embodiment, the UE may report a timing for performing a measurement together with channel state information (CSI) for each transmission burst or subframe. A CSI measurement for the CSI reported by the UE at any time point may be limited within one transmission burst or one subframe (or one subframe group). The UE reports a timing for performing a corresponding CSI measurement together with the CSI.

In a second embodiment, a transmission burst or subframe for a CSI measurement may be limited on the basis of a CSI report time point or a time point at which the CSI report is triggered. The CSI reported by the UE may be limited within one transmission burst or one subframe (or one subframe group) corresponding to a specific time point associated with the CSI report time point. The CSI reported by the UE may be limited within one transmission burst or one subframe (or one subframe group) corresponding to a specific time point associated with the time point at which the CSI report is triggered.

In a third embodiment, when the CSI is measured based on the CSI-RS, the UE may report information regarding whether the CSI is measured based on the CSI-RS actually received. The UE determines whether the CSI-RS is actually transmitted, through energy detection or the like. The UE may report only the CSI regarding the actually transmitted CSI-RS, or may report information regarding whether the CSI-RS is actually transmitted, together therewith.

Now, PDSCH transmission in CoMP is proposed.

In the conventional 3GPP LTE, for DPS or JT transmission of a PDSCH in the CoMP-B scheme, a PDCCH for scheduling a PDSCH may be transmitted only through a specific cell ID. This implies that a TP which transmits the PDSCH may be different from a TP which transmits a PDCCH for scheduling the PDSCH. In an unlicensed band, there may be a case where the TP for transmitting the PDCCH cannot perform DPS transmission due to a failure in CCA even if the TP for transmitting the PDSCH has succeed in the CCA. Therefore, the following scheme is proposed.

At least one TP which has succeeded in the CCA among TPs having different cell IDs in the CoMP group may transmit the PDCCH for scheduling the PDSCH. A TP which transmits the PDCCH is called a scheduling TP. Since the UE cannot know which TP will transmit the PDCCH, PDCCH detection may be attempted for a PDCCH candidate corresponding to a plurality of cell IDs.

Figure 6:
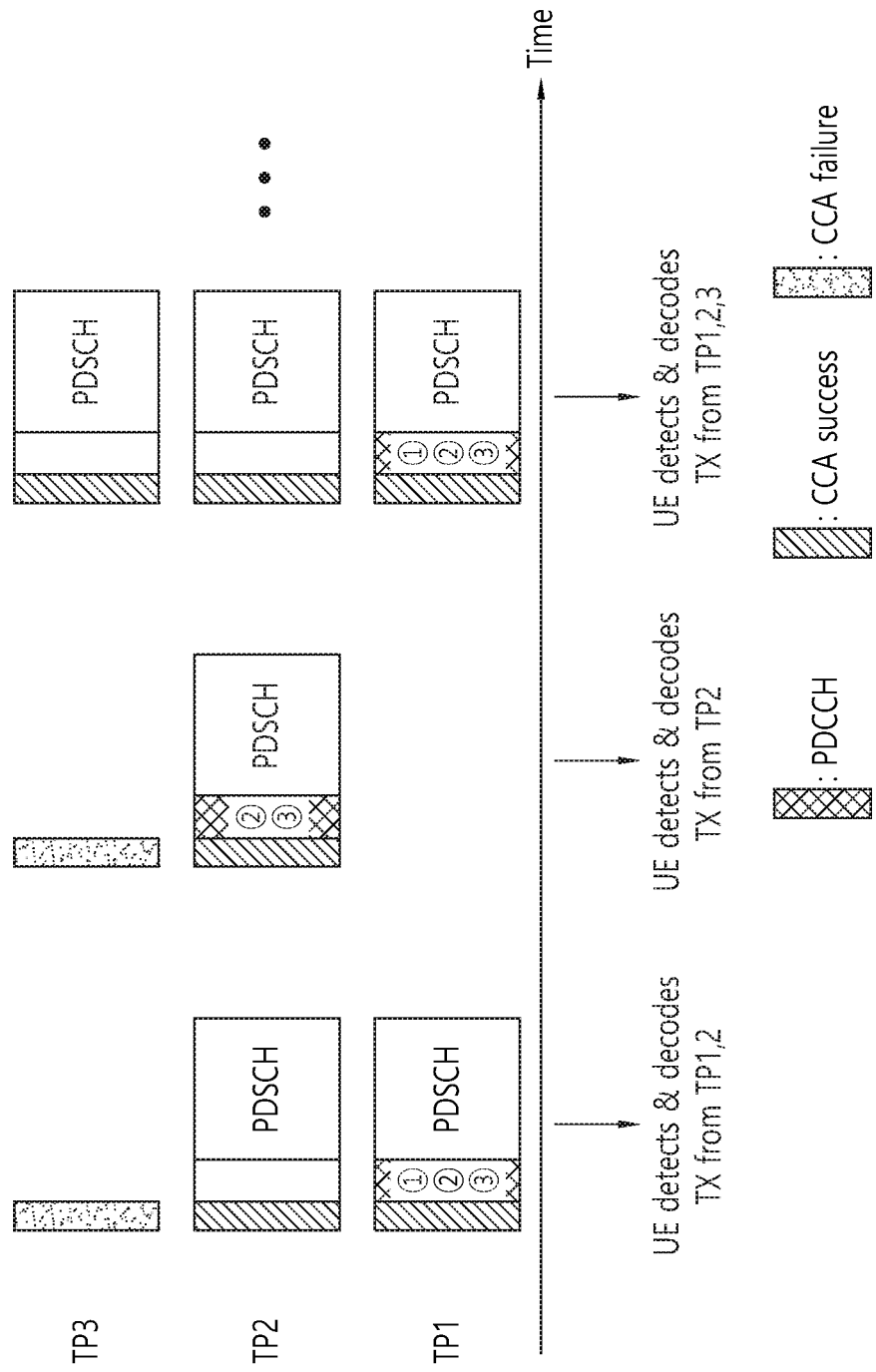
FIG. 6 shows physical downlink shared channel (PDSCH) transmission according to an embodiment of the present invention.

FIG. 6 shows PDSCH transmission according to an embodiment of the present invention.

It is assumed that JT transmission is applied to a PDSCH based on CoMP-A or CoMP-B in an unlicensed band. Even if a network plans simultaneous transmission through any TP combination in the CoMP group and configures a PDCCH including scheduling information based on the planning, transmission of only some TPs may be possible among corresponding TP combinations according to a CCA result for each TP at an actual PDCCH/PDSCH transmission time point. Therefore, PDSCH decoding may fail if a UE assumes that all TPs in the CoMP group transmit a DM-RS and a PDSCH or assumes a TP combination for transmitting a DM-RS and a PDSCH according to scheduling information in the PDCCH.

Accordingly, the UE may detect a TP which actually transmits a DM-RS/PDSCH among a plurality of candidate TPs and may apply it to PDSCH decoding. The UE may detect a TP which actually transmits a DM-RS/PDSCH among all TPs in the CoMP group or TPs scheduled for PDSCH transmission through a PDCCH, and may decode the PDSCH by assuming that only the TP transmits the DM-RS/PDSCH. Reception energy or the like of a DM-RS allocated to each TP may be used in detection of the TP which actually performs the transmission. Scheduling information on each PDSCH may conform to scheduling information designed in the PDCCH. The UE may decode the PDSCH under the assumption that, for the TP which has detected the PDCCH, a DM-RS/PDSCH scheduled to be transmitted through the TP is transmitted.

For example, it is assumed that there are three TPs, i.e., TP1, TP2, and TP3.

In a first example, it is assumed that the TP1 and the TP2 succeed in CCA, and a PDCCH of the TP1 schedules PDSCH simultaneous transmission of the TP1/TP2/TP3. The UE has detected the PDCCH of the TP1, and has failed in detection of any PDSCH in the TP3. Accordingly, the UE may perform PDSCH decoding in the TP1/TP2.

In a second example, only the TP2 succeeds in CCA. The PDCCH of the TP2 schedules PDSCH simultaneous transmission of the TP2/TP3. The UE has detected the PDCCH of the TP2, but has not detected any PDSCH in the TP3. Accordingly, the UE may perform PDSCH decoding in the TP2.

In a third example, the TP1, the TP2, and the TP3 succeed in CCA. It is assumed that the PDCCH of the TP1 schedules PDSCH simultaneous transmission of the TP1/TP2/TP3. The UE may detect the PDCCH of the TP1, and thus may perform PDSCH decoding in the TP1/TP2/TP3.

Figure 7:
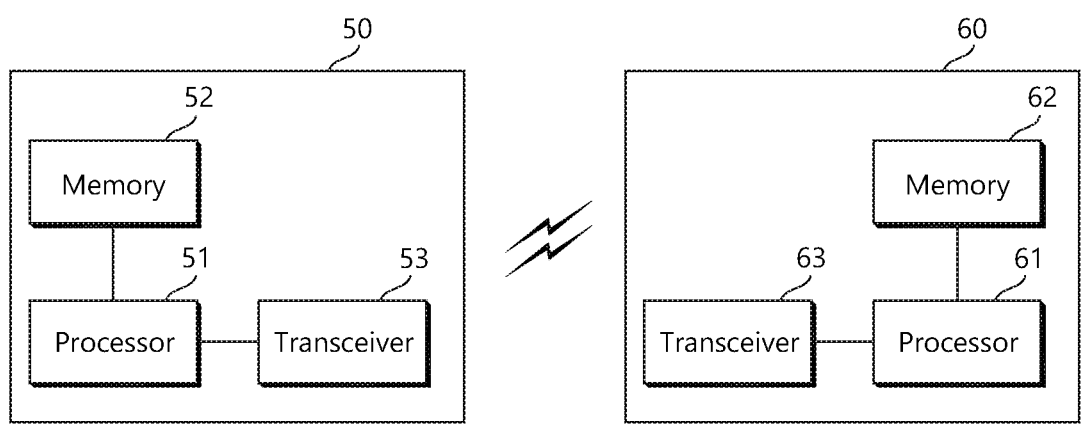
FIG. 7 is a block diagram showing a wireless communication system according to an embodiment of the present invention.

FIG. 7 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for coordinated multi-point (CoMP) transmission in an unlicensed band in which a transmission point (TP) transmits a signal after a clear channel assessment (CCA) is confirmed, the method performed by a wireless device and comprising:

receiving a physical downlink control channel (PDCCH) from a first TP operating in the unlicensed band, the PDCCH including a cell identifier identifying a second TP operating in the unlicensed band and scheduling information for scheduling a physical downlink shared channel (PDSCH) in the second TP;

receiving a reference signal from the second TP in accordance with the scheduling information, the reference signal being used by the wireless device to decode the PDSCH;

checking, based on a receiving energy value of the reference signal, whether the PDSCH is actually to be transmitted by the second TP in accordance with the scheduling information; and receiving and decoding the PDSCH from the second TP in accordance with the scheduling information when the actual transmission of the PDSCH is confirmed.

2. The method of claim 1, wherein, if the receiving energy value of the reference signal is greater than a threshold, the actual transmission of the PDSCH is confirmed.

3. A device supporting coordinated multi-point (CoMP) transmission in an unlicensed band in which a transmission point (TP) transmits a signal after a clear channel assessment (CCA) is confirmed, the device comprising:

a transceiver configured to transmit and receive a radio signal; and a processor operatively coupled to the transceiver and configured to:

control the transceiver to receive a physical downlink control channel (PDCCH) from a first TP operating in the unlicensed band, the PDCCH including a cell identifier identifying a second TP operating in the unlicensed band and scheduling information for scheduling a physical downlink shared channel (PDSCH) in the second TP;

control the transceiver to receive a reference signal from the second TP in accordance with the scheduling information, the reference signal being used by the device to decode the PDSCH;

control the transceiver to check, based on a receiving energy value of the reference signal, whether the PDSCH is actually to be transmitted by the second TP in accordance with the scheduling information; and control the transceiver to receive and decode the PDSCH from the second TP in accordance with the scheduling information when the actual transmission of the PDSCH is confirmed.

4. The device of claim 3, wherein, if the receiving energy value of the reference signal is greater than a threshold, the actual transmission of the PDSCH is confirmed.

* * * * *